US011853610B2

(12) United States Patent
Shapiro

(10) Patent No.: US 11,853,610 B2
(45) Date of Patent: Dec. 26, 2023

(54) PASS-THROUGH COMMAND QUEUES FOR UNMODIFIED STORAGE DRIVERS

(71) Applicant: iodyne, LLC, Mill Valley, CA (US)

(72) Inventor: Michael W. Shapiro, Mill Valley, CA (US)

(73) Assignee: iodyne, LLC, Mill Valley, CA (US)

(*) Notice: Subject to any disclaimer, the term of this patent is extended or adjusted under 35 U.S.C. 154(b) by 0 days.

(21) Appl. No.: 17/669,651

(22) Filed: Feb. 11, 2022

(65) Prior Publication Data

US 2022/0261188 A1 Aug. 18, 2022

Related U.S. Application Data

(60) Provisional application No. 63/149,778, filed on Feb. 16, 2021.

(51) Int. Cl.
G06F 3/06 (2006.01)
(52) U.S. Cl.
CPC .......... *G06F 3/0659* (2013.01); *G06F 3/0604* (2013.01); *G06F 3/067* (2013.01); *G06F 3/0634* (2013.01)

(58) Field of Classification Search
CPC ...... G06F 3/0659; G06F 3/067; G06F 3/0604; G06F 3/0634
See application file for complete search history.

(56) References Cited

U.S. PATENT DOCUMENTS

| 2006/0101130 | A1* | 5/2006 | Adams | H04L 61/00 709/218 |
|---|---|---|---|---|
| 2007/0168668 | A1* | 7/2007 | Chang | G07F 7/1008 713/176 |
| 2010/0070655 | A1* | 3/2010 | Chamley | G06F 13/4291 710/22 |
| 2010/0180063 | A1* | 7/2010 | Ananny | H04L 67/563 710/52 |
| 2015/0006841 | A1* | 1/2015 | Chen | G06F 13/1673 711/167 |

* cited by examiner

*Primary Examiner* — Mark A Giardino, Jr.
(74) *Attorney, Agent, or Firm* — Chamberlain, Hrdlicka, White, Williams, & Aughtry

(57) ABSTRACT

A storage device for providing data storage services to a host includes persistent storage for storing a file and a controller. The controller obtains a write request from the host for the file, the write request comprises a command packet; perform processing of the command packet using a payload portion of the file; generate a response packet based on the processing of the command packet; and store the response packet in a response portion of the file in response to the write request.

15 Claims, 10 Drawing Sheets

PASS-THROUGH COMMAND QUEUES FOR UNMODIFIED STORAGE DRIVERS

CROSS-REFERENCE TO RELATED APPLICATIONS

This application claims benefit of U.S. Provisional Patent Application No. 63/149,778 and entitled: "PASS-THROUGH COMMAND QUEUES FOR UNMODIFIED STORAGE DRIVERS FOR PORTABLE STORAGE DEVICES." under 35 U.S.C. § 120. U.S. Provisional Patent Application No. 63/149,778 is hereby incorporated by reference in its entirety.

Computing devices may process information. When information is processed, the results of the processing may be new information that may need to be stored for future use.

SUMMARY

In one aspect, a storage device for providing data storage services to a host in accordance with one or more embodiments of the invention includes persistent storage for storing a file and a controller. The controller obtains a write request from the host for the file, the write request comprises a command packet; perform processing of the command packet using a payload portion of the file; generate a response packet based on the processing of the command packet; and store the response packet in a response portion of the file in response to the write request.

In one aspect, a method for providing data storage services to a host using a storage device in accordance with one or more embodiments of the invention includes obtaining, by the storage device, a write request from the host for a file stored in the storage device, wherein the write request comprises a command packet; processing, by the storage device, the command packet using a payload portion of the file; generating, by the storage device, a response packet based on the processing of the command packet; and storing, by the storage device, the response packet in a response portion of the file in response to the write request.

In one aspect, a non-transitory computer readable medium in accordance with one or more embodiments of the invention includes computer readable program code, which when executed by a computer processor enables the computer processor to perform a method for providing data storage services to a host using a storage device. The method includes obtaining, by the storage device, a write request from the host for a file stored in the storage device, wherein the write request comprises a command packet; processing, by the storage device, the command packet using a payload portion of the file; generating, by the storage device, a response packet based on the processing of the command packet; and storing, by the storage device, the response packet in a response portion of the file in response to the write request.

Other aspects of the invention will be apparent from the following description and the appended claims.

DETAILED DESCRIPTION

Figure 1A:
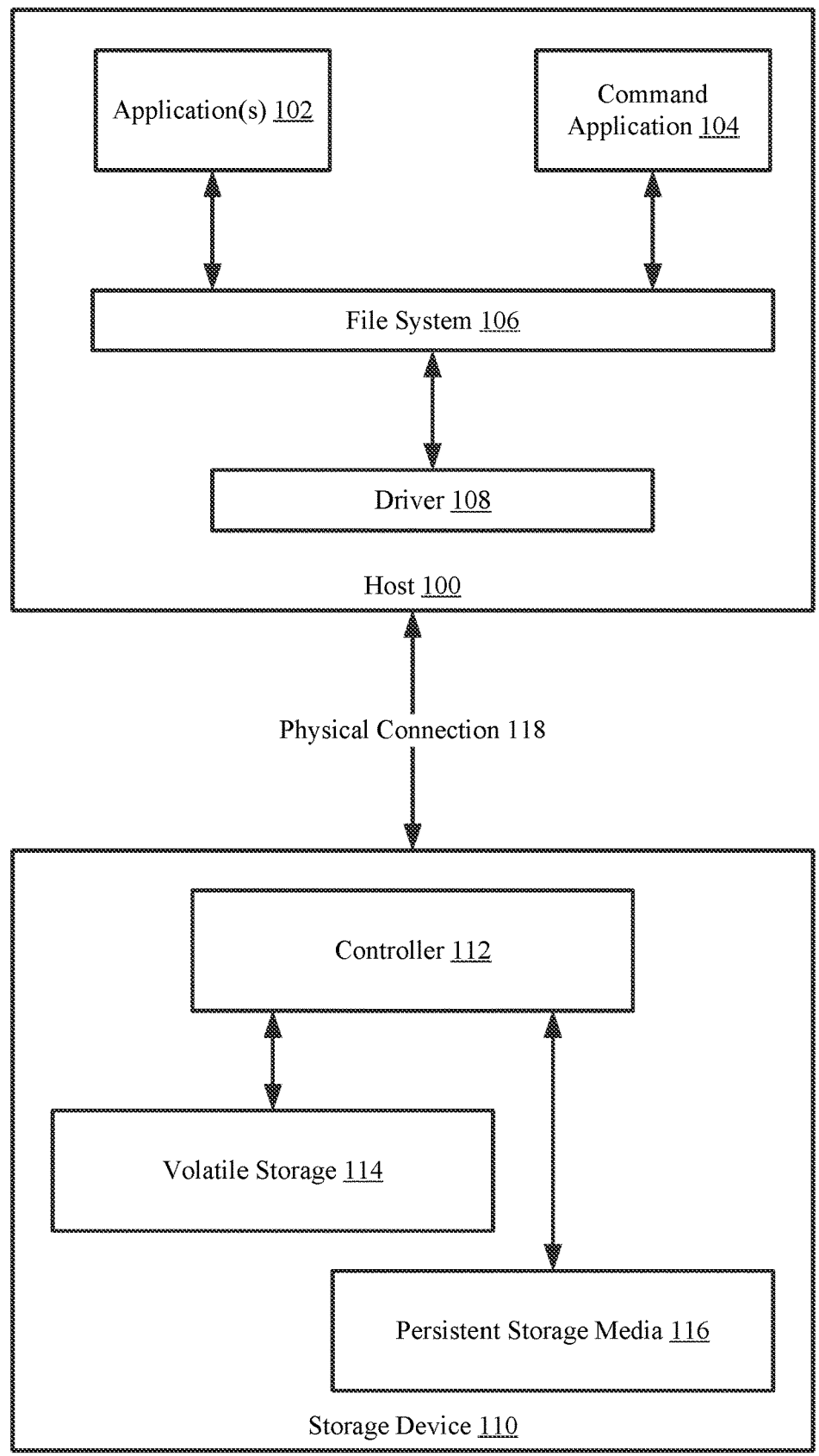
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Computer storage devices provide services beyond reading and writing data. Services may be provided to access failure condition statistics, power-on hours, temperature information, and other management functionality. Computer operating systems use device drivers to communicate with storage devices. Device drivers may not provide access to all of the additional services of a particular storage device. One method to extend the capability of the device driver is a "pass-through" command, whereby an application can access additional storage device functionality without the knowledge of the device driver, because the device driver "passes through" this command as opaque data from the application directly to the storage device. However, some operating systems and device drivers do not implement a "pass-through" command, or restrict access to it for security reasons. In these scenarios, one or more embodiments of the invention provides a mechanism for a storage device and a participating application to implement a pass-through command queue that works with any device driver, without any knowledge of the driver, or explicit driver "pass-through" mechanism.

In general, embodiments of the invention relate to systems, devices, and methods for invoking the functions of devices. A system may include a first computing device (e.g., "the host") that is executing an application that wishes to invoke a function of a second device (e.g., the storage controller). The host device may include a device driver that manages communications with the storage controller. The device driver may not support the function of the storage controller that the application wishes to invoke.

To invoke the function of the storage controller, the application may cause a write request to be generated that includes a predetermined bit sequence corresponding to the function. Additionally, the write request may be directed to a predetermined location in persistent storage of the second device.

When the storage controller receives the write request, the storage controller, based on the write request being directed towards the predetermined location, that the write request is not a write request. Rather, the storage controller may determine that the write request, in fact, indicates that the function, corresponding to the predetermined bit sequence to be written by the write request, is to be performed. Consequently, the storage controller may perform the function rather than writing the bit sequence included in the write request.

By doing so, the function of the storage controller may be invoked even through the driver was unable to invoke the function of the storage controller. Consequently, using the methods described herein, any number of functions, unsupported by drivers or management entities of devices, may be invoked. Accordingly, even devices that have management entities that are out of date or that do not support some of the functionalities of other devices may still invoke the functionalities of the other devices.

In one or more embodiments of the invention, the storage controller obtains a write request from a host application for blocks associated with a predefined file, the write request comprises a command packet; the controller performs processing of the command packet using a payload portion of the file; generates a response packet based on the processing of the command packet; and stores the response packet in a response portion of the file in response to the write request. The host application can then read the response packet.

FIG. 1A shows a system in accordance with one or more embodiments of the invention. The system may include any number of hosts (e.g., 100) and a storage device (110).

A host (e.g., 100) may provide computer implemented services to users (e.g., persons, other computing devices) of the host. The computer implemented services may include, for example, database services, instant messaging services, electronic communication service, web browsing services, and/or other types of services desired by users of the host.

To provide computer implemented services, the host (100) may include a file system (106) that manages the process of storing data, applications (102) that provide some of the computer implemented services provided by the host, and/or a driver (108) that enables the file system to use the storage device (110) to store data. Each of these components of the host (100) is discussed below.

The applications (102) may provide all, or a portion, of the computer implemented services utilized by users of the host. For example, the applications (102) may include database applications that store and provide stored data, electronic communications applications that enable users of the hosts to send and receive electronic messages, web browsing applications that enables users of the hosts to view content hosted by other computing devices, etc. When providing their functionalities, the applications (102) may store data and retrieve previously stored data.

For example, when an electronic communication application provides its functionality, it may need to store electronic communications (e.g., emails) for future use by a user and retrieve previously stored electronic communications to provide users with information regarding previously obtained electronic communications. The aforementioned information regarding the electronic communications may be stored in persistent storage of the host (100) and/or persistent storage of other devices such as the storage device (110).

As used herein, persistent storage refers to physical storage media such as, for example, hard disk drives, solid state disk drives, tape drives, and/or other types of devices that enable data to be stored and retrieved after being stored. These devices may store data when unpowered, through power cycling, and/or when host devices are unpowered. Consequently, when data is stored in persistent storage, it may be retrieved in the future unless erased (or lost due to failure modes or otherwise undesirable operation of the devices).

To store and retrieve stored data, the applications (e.g., 102) may utilize services provided by the file systems (106). In other words, rather than attempting to store data in persistent storage directly, the applications may make calls (e.g., requests) to or otherwise utilize services provided by the file system to store and retrieve stored data. The file system (106) may (i) manage the process of storing data, (ii) store the data in a manner consistent with an organizational framework (e.g., in accordance with a file allocation table), and/or (iii) perform other actions that abstract the process of data storage and retrieval to provide the applications (102) and/or other entities with a simplified process for storing and retrieving stored data.

In one or more embodiments of the invention, the file system (106) enables the applications (102) to store and retrieve data by organizing the data into named files. To store data, the applications (102) may instruct the file system to store data using a file name and an offset. To retrieve stored data, the applications (102) may instruct the file system to provide it with the data associated with the file name and the offset. Consequently, the file system (106) of the hosts may provide applications with a simplified method of storing data in persistent storage. While described with respect to a file system, a host in accordance with embodiments of the invention may use other systems for organizing data and abstracting the process of storing data without departing from the invention.

The file system (106) may store data using any method without departing from the invention. For example, the file system (106) may implement an operation or storage model for storing data. The aforementioned model may enable the file system (106) to translate the data storage requests from the applications into one or more actions to be performed.

The file system (106) implemented by the operating systems of the host (100) may utilize a driver (108) to store and retrieve stored data in the storage device (110). Persistent storage media devices may, depending on the type of device, have a limited number and type of commands to which they respond. Consequently, when the file system (106) translates data storage requests from applications into an action(s), the driver (108) may further convert these actions into one or more commands supported by the persistent storage media (i.e., the storage device (110)). The commands may cause the persistent storage media devices to perform any number and type of actions (e.g., functions) that may cause data to be stored in and/or retrieved from them. Thus, the drivers may abstract the limited number and type of commands to which the persistent media storage devices respond to a predetermined set of commands known to the file system (106).

However, in some cases, the driver (108) and/or file system (106) may be unaware of all of the commands which the storage device (110) supports (e.g., knows how to perform). Consequently, the file system (106) and driver (108) may be unable to invoke all, or a part, of the functionality of the storage device (110). Accordingly, because the applications (102) utilize the file system (106) and driver (108) to utilize the storage device (110), the applications (102) may be unable to invoke a portion of the functionality of the storage device (110) using the limited number of commands supported by the file system (106) and/or driver (108).

Further, in some cases, drivers (108) may not support pass-through modes of operation where the driver (108) simply sends bit sequences, specified by the applications (102) and/or file system (106), to the storage device (110). In such scenarios, applications (102) may be unable to invoke functionality of storage device (110) that the driver (108) does not support (e.g., a driver does not support a function when the application cannot instruct the driver to invoke a function of the storage device).

In general, embodiments of the invention provide methods and system for invoking functionality of devices which drivers do not support and/or for drivers that do not support passthrough modes. To do so, a storage device in accordance with embodiments of the invention may monitor predetermined locations where applications of a host may store specially formatted data. The applications may store, e.g., using the command application (104), the specially formatted data in the predetermined locations by invoking write commands supported by file systems and drivers. Thus, information regarding functionality of a storage device that is not supported by a driver but which an application desires to invoke may be written to persistent storage media of the storage device.

When the storage device receives the write command from the driver corresponding to the predetermined locations, the storage device may ascertain whether the writes include a payload or a command packet (e.g., specially formatted data) that indicates that functionality of the storage device not supported by the driver is to be performed. If the writes include a command packet (e.g., a predetermined bit sequence instructed to be written to a predetermined location), the storage device may process the command packet thereby performing a functionality which the driver is unable to invoke.

By doing so, a system in accordance with embodiments of the invention may enable applications of a host to invoke functionality of a device that is unknown to management entities (e.g., file systems, drivers, etc.) of the host even when the management entities do not support pass-through modes of operation. Consequently, the system may enable applications to invoke device functionality of which the management entities are unaware and/or does not support.

To enable applications (102) to invoke functionality of the storage device (110) that is not supported by the driver (108), the storage device (110) may include persistent storage media (116), volatile storage (114), and a controller (112). Each of these components is discussed below.

The persistent storage media (116) may include any number of persistent storage media devices such as, for example, hard disk drives, solid state disk drives, tape drives, and/or any other type of persistent storage media devices. The persistent storage media (116) may include any number and type of such devices.

Each of the persistent storage media devices may enable data to be stored, accessed, and deleted. Different persistent storage media devices may include similar or different amounts of storage space.

The persistent storage media (116) may also include other types of devices that, for example, load balance data storage, buffer writes, and/or perform other functions.

The controller (112) may manage storage of data in the persistent storage media (116). To manage the storage of data, the controller (112) may (i) service commands (e.g., read, write, delete, etc.) issued by the driver (108), (ii) monitor writes to predetermined locations in the persistent storage media to identify whether an application (102) is invoking a functionality of the storage device (110) (e.g., a function that is not supported by the driver (108)), and/or (iii) perform the functionality when invoked by the applications (102).

The controller (112) may include functionality to obtain commands from the host (100) using any number of physical connections (e.g., 118) to the host (100). In one embodiment of the invention, the physical connection (118) may represent any tangible cable, or an assembly of wires, configured for inter-device data transfer. Examples of the physical connection may include, but are not limited to, a FireWire cable (which is based on IEEE 1394), a serial advanced technology attachment (SATA) (or any variant thereof) cable, a universal serial bus (USB) (or any variant thereof) cable, a small computer system interface (SCSI) (or any variant thereof) cable, a serial-attached SCSI (SAS) (or any variant thereof) cable, a Thunderbolt cable, or any other cabling solution supported by the storage device. The commands may be issued (e.g., generated by and sent to the storage device (110) via the physical connection (118)) by the driver (108).

When a write command is received from the driver (108), the controller (112) may compare the location of the write (e.g., one or more logical block addresses in the persistent storage media (116)) to predetermined locations. If the write is to a predetermined location, the controller (112) may determined that the write includes instructions (rather than data to be stored for future use) from an application to perform a functionality. The content of the write may indicate which functionality to perform. Additional information, previously stored in the persistent storage media by an application, may be used by the controller to perform the functionality.

The storage device (110) may map all, or a portion, of its functionalities to corresponding bit sequences (e.g., specially formed data) that may be written to the predetermined locations in the persistent storage media (116). Consequently, the applications (102) may invoke any of the functionalities, even those not supported by the driver (108) and/or file system (106), by writing specially formed data (e.g., bit sequences) to the predetermined locations in the persistent storage media (116).

Figure 1B:
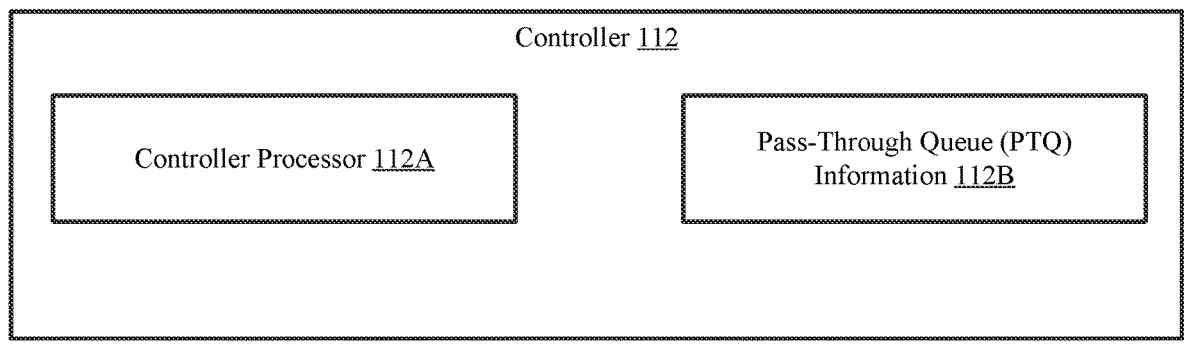
FIG. 1B shows a diagram of a controller in accordance with one or more embodiments of the invention.
Figure 1C:
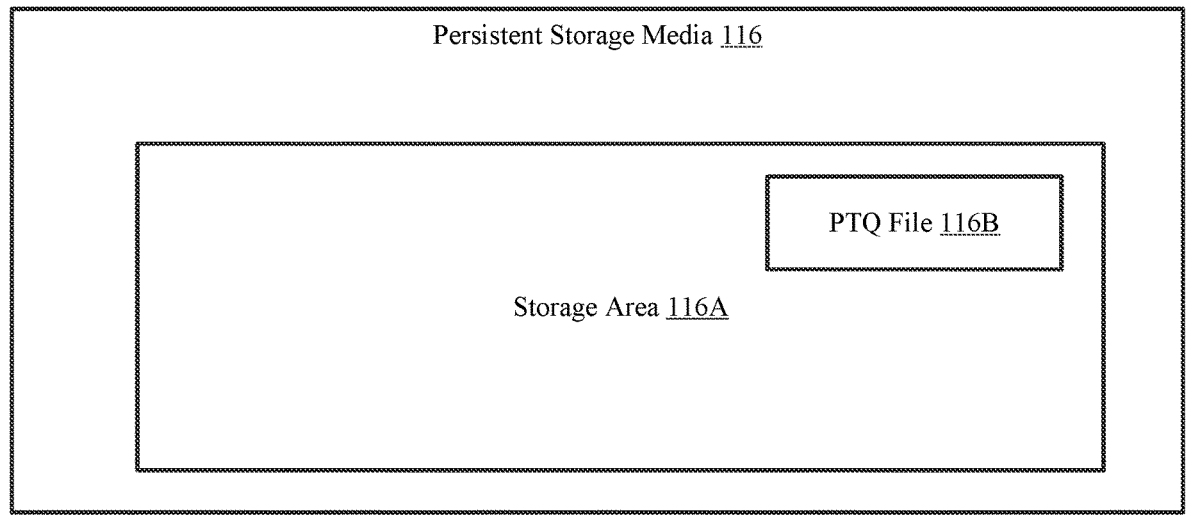
FIG. 1C shows a diagram of a persistent storage medium in accordance with one or more embodiments of the invention.
Figure 1D:
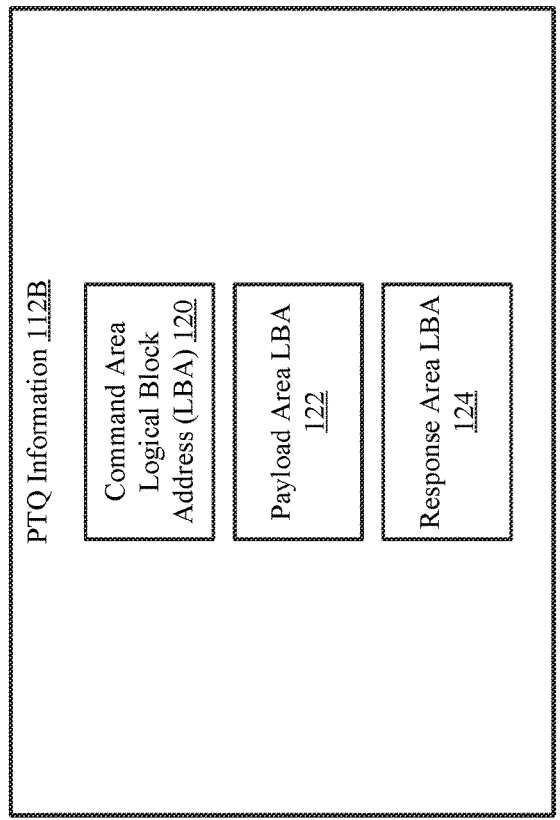
FIG. 1D shows a diagram of pass-through queue information in accordance with one or more embodiments of the invention.
Figure 1E:
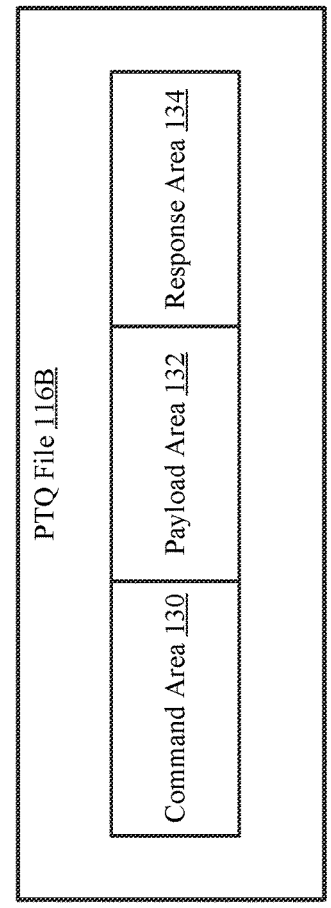
FIG. 1E shows a diagram of a pass-through queue file in accordance with one or more embodiments of the invention.

When providing its functionality, the controller (112) may store data in volatile storage (114) (e.g., memory) and/or the persistent storage media (116). Refer to FIGS. 1B and 1D for additional information regarding data stored in volatile storage (114). Refer to FIGS. 1B, 1C, and 1E for additional information regarding data stored in persistent storage media (116). One of ordinary skill in the art will appreciate that data stored in each of these storages (114, 116) may be transitioned between the storages as required for the controller (112) to provide its functionality.

To enable the applications (102) to invoke the functionalities of the storage device (110) by writing data, the host (100) may include a command application (104). The command application (104) may be an application that assists the applications (102) to invoke the functionalities of the storage device (110). For example, the command application (104) may notify the applications (102) of the functionalities of the storage device (110) that may be invoked, assist the applications (102) in generating bit sequences that when written to predetermined locations invoke the functionalities of the storage device (110), and/or enable the applications (102) to obtain responses or other information generated by the storage device (110) when its functionalities are invoked.

In one or more embodiments of the invention, a copy of the command application (104) is stored in the persistent storage media (116) of the storage device (110). When the host (100) connects to the storage device (110), the host (100) may obtain a copy of the command application (104) (e.g., computer code) from the persistent storage media (116). Once obtained, the host (100) may execute (e.g., begin execution of the computer code using a processor) the command application (104) thereby enabling the applications (102) to learn of and invoke the functionalities of the storage device (110), including those not supported by the driver (108) and/or file system (106). In another embodiment of the invention, the command application (104) may be obtained from another source (i.e., a source other than the storage device (110)) and installed on the host (100).

The applications (102), command application (104), file system (106), and/or driver (108) may be implemented using one or more hardware components that include circuitry. The hardware components may include, for example, application specific integrated circuits (ASIC), programmable gate arrays, embedded processors, general purpose processors, etc. The circuitry of the hardware components may be adapted to perform the functionality of the applications (102), command application (104), file system (106), and/or driver (108). The hardware components (e.g., processors) of the host (100) may be adapted to execute computer instructions stored in persistent storage that when executed cause a processor of the hardware components to perform the functionality of the applications (102), command application (104), file system (106), and/or driver (108).

When providing its functionality, the applications (102), command application (104), file system (106), and/or driver (108) may perform all, or a portion, of the methods illustrated in FIGS. 2-6.

The controller (112) may be implemented using one or more hardware components that include circuitry. The hardware components may include, for example, application specific integrated circuits (ASIC), programmable gate arrays, embedded processors, general purpose processors, etc. The circuitry of the hardware components may be adapted to perform the functionality of the controller (112). The hardware components (e.g., processors) of the controller (112) may be adapted to execute computer instructions stored in persistent storage that when executed cause a processor of the hardware components to perform the functionality of the controller (112).

When providing its functionality, the controller (112) may perform all, or a portion, of the methods illustrated in FIGS. 2-6.

The host (100) may be implemented using computing devices. The computing devices may be, for example, mobile phones, tablet computers, laptop computers, desktop computers, servers, and cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the components illustrated in FIG. 1A described in this application and/or all, or a portion, of the methods illustrated in FIGS. 2-6. The host (100) may be implemented using other types of computing devices without departing from the invention. For additional details regarding computing devices, refer to FIG. 8.

The host (100) and/or storage device (110) may be implemented using logical devices without departing from the invention. For example, the host (100) and/or storage device (110) may be implemented using virtual machines that utilize computing resources of any number of physical computing devices (e.g., refer to FIG. 8) to provide their respective functionalities. The host (100) and/or storage device (110) may be implemented using other types of logical devices without departing from the invention.

In some embodiments of the invention, the host (100) and/or storage device (110) may be implemented using a combination of physical and logical devices. For example, the host (100) may be implemented as virtual machines hosted by a computing device. The computing device may be connected to the storage device (110). A hypervisor (or other management entity) may provide virtual connections between the virtual machine and the storage device (110) by virtualizing the physical connection (118) between the computing device and the storage device (110).

While the system of FIG. 1A has been illustrated as including a limited number of specific components, a system in accordance with embodiments of the invention may include additional, fewer, and/or different components without departing from the invention.

Turning to FIG. 1B, FIG. 1B shows a diagram of the controller (112) in accordance with one or more embodiments of the invention. The controller (112) may (i) manage storage and retrieval of stored data from persistent storage, (ii) identify instructions included in writes to invoke functionality of the storage device rather than writing data to persistent storage, and (iii) execute the instructions by performing one or more functionalities.

Performing the functionalities may include, for example, performing predetermined processing, generating a result of the processing, and storing the result of the processing at a predetermined location in persistent storage media. By doing so, an application may subsequently perform a read to obtain the result of the processing.

To provide the above noted functionality, the controller (112) may include a controller processor (112A) and pass-through queue (PTQ) information (112B).

The controller processor (112A) may be a physical device that provides the functionality of the controller (112). For example, the controller processor (112A) may be implemented using circuitry adapted to perform the functionality of the controller (112). When doing so, the controller processor (112A) may execute computer code that causes the controller processor (112A) to perform the functionality of the controller (112), discussed above, and/or all, or a portion, of the methods illustrated in FIGS. 2-6.

The PTQ information (112B) may be one or more data structures that include information used by the controller processor (112A) to identify instructions specified by writes to the data storage. The PTQ information (112B) may be stored, for example, in volatile storage of the controller (112), other volatile storage of the storage device, and/or in other locations without departing from the invention. The PTQ information (112B) may be implemented using any number and type of data structures including, for example, lists, tables, linked lists, databases, etc. For additional details regarding the PTQ information (112B), refer to FIG. 1D.

While described as included a limited number of specific components, a controller in accordance with embodiments of the invention may include additional, fewer, and/or different components from those illustrated in FIG. 1B without departing from the invention.

Turning to FIG. 1C, FIG. 1C shows a diagram of a persistent storage media (116) in accordance with one or more embodiments of the invention. As noted above, the persistent storage media (116) may be implemented using any number of persistent storage media devices that include any quantity of storage resources.

The storage resources of the persistent storage media devices may be organized into one or more storage areas (e.g., 116A). A storage area may be a finite quantity of the storage resources of the persistent storage media devices.

A PTQ file (116B) may be stored in one of the storage areas (e.g., 116A). The PTQ file (116B) may be stored in predetermined storage area (e.g., 116A) and/or act as a predetermined location where applications direct writes that actually include instructions rather than data to be stored for future use. Consequently, when stored in the storage area (116A), applications may direct writes to the PTQ file (116B) based on a name (or other identifier) assigned to the PTQ file (116B) and/or a name (or other identifier) of the storage area (116A). Accordingly, applications of a host may cause a storage device to execute functionality by writing to the PTQ file (116B).

The PTQ file (116B) may be one or more data structures (e.g., a file having a predetermined structure). The PTQ file (116B) may be implemented using any number and type of data structures including, for example, lists, tables, linked lists, databases, etc. For additional details regarding the PTQ file (116B), refer to FIG. 1E.

While not illustrated in FIG. 1C the persistent storage media (116) may also include a copy of the command application. The copy of the command application may be, as noted above, provided to hosts so that the applications may be notified of the functionalities of the storage device (including some not supported by drivers implemented by the host) and how to invoke those functionalities by writing data to the storage device.

While the persistent storage media (116) has been described as including a limited number of specific components, a persistent storage media in accordance with one or more embodiments of the invention may include additional, fewer, and/or different components than those illustrated in FIG. 1C without departing from the invention.

Turning to FIGS. 1D and 1E, FIG. 1D shows a diagram of the PTQ information (112B) in accordance with one or more embodiments of the invention and FIG. 1E shows a diagram of the PTQ file (116B) in accordance with one or more embodiments of the invention. As noted above, the PTQ information (112B) may include information usable by a controller to ascertain whether a write directed towards the PTQ file (116B) includes instructions, rather than data, to invoke a functionality of the storage device.

The PTQ information (112B) may include a command area logical block address (LBA) (120), a payload area LBA (122), and a response area LBA (124). These LBAs may identify different portions of the PTQ file (116B) which may be used for different purposes.

For example, the command area LBA (120) may specify addresses of blocks of data of the storage area (116A, FIG. 1B) that, if written to, are to be interpreted as being a command packet (rather than data to be written to the block of data). The command area LBA (120) may include addresses of a command area (130) of the PTQ file (116B).

A command packet may be a data structure that includes a bit sequence which the controller interprets as an instruction to perform a functionality corresponding to the bit sequence. Different bit sequences may correspond to different functionalities. Thus, when a write is received that is directed to the command area (e.g., 130, FIG. 1E) is received by the controller, the controller may initiate performance of a functionality rather that performing a write (though, the functionality may include performance of one or more writes) as would normally be performed when writes directed towards other area of the persistent storage media are obtained by the controller.

In another example, the payload area LBA (122) may specify addresses of blocks of data of the storage area (116A, FIG. 1B) that, if written to, are to be interpreted as being a payload for use with command packet that will be sent in the future. When a write directed toward a payload area (e.g., 132, FIG. 1E) is received by a controller, the controller may write the data (e.g., a payload) to the payload area (e.g., 132, FIG. 1E) of the PTQ file (116B, FIG. 1E). Consequently, when a command packet is obtained in a future write, the functionality invoked by the packet may include performing some processing or otherwise using the data (i.e., a payload) written to the payload area.

In a further example, the response area LBA (124) may specify addresses of blocks of data of the storage area (116A, FIG. 1B) that may be used to provide a response to an application in response to invocation of a functionality of the storage device by the application. When an application invokes a functionality of the storage, the functionality may include providing information (e.g., a response packet) to an invoking entity (e.g., an application). To provide that information, the information may be stored in a response area (e.g., 134) of the PTQ file (116B). After the functionality invoked by a write to the PTQ file (116B, FIG. 1E) is complete, the entity that invoked the functionality may read the response area (134, FIG. 1E) to obtain the response packet.

Thus, using the PTQ information (112B, FIG. 1D), a controller may identify instructions, that may appear to be writes, to perform functionalities based on to which addresses (e.g., the command area LBA (120)) the writes are directed.

While the PTQ information (112B) has been described as including LBAs, one of ordinary skill in the art will appreciate that different types of information may be utilized to specify locations in the persistent storage media. For example, if different organizational frameworks are used to organize the storage resources of the persistent storage media, the PTQ information (112B) may include different types and quantities of information.

Similarly, while the PTQ file (116B) has been described as being a file, the PTQ file (116B) may be organized differently without departing from the invention. Further, while the PTQ file (116B) has been described as including three areas and corresponding to some number of LBAs, the PTQ file (116B) may include different numbers of areas organized using any method without departing from the invention.

Additionally, the command application (104) may include information similar to the PTQ information (112B). Consequently, the command application (104) may be aware of where to write data, the bit sequences to write, and/or other information to invoke the functionalities of the storage device and obtain responses based on the invoked functionalities of the storage device.

As discussed above, the components of the system of FIGS. 1A-1E may perform methods that enable applications to invoke functionality of storage devices. FIGS. 2-6 illustrate methods that may be performed by the components of FIG. 1A.

Figure 2:
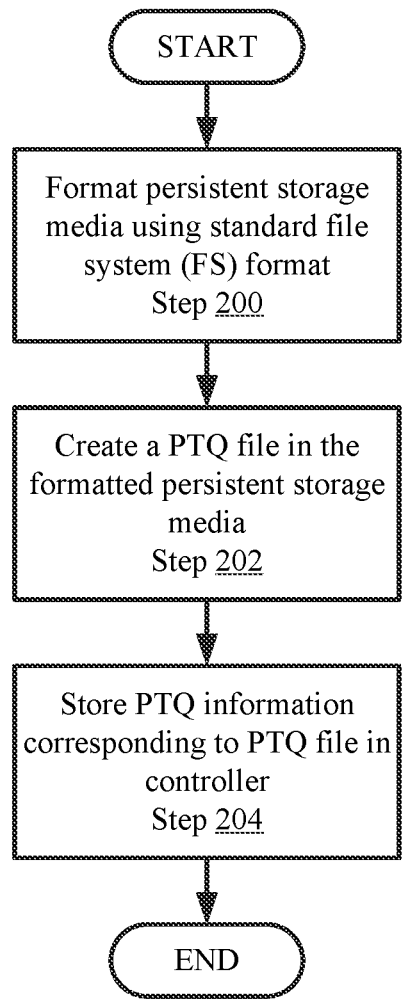
FIG. 2 shows a flowchart of a method of obtaining pass-through queue information in accordance with one or more embodiments of the invention.

FIG. 2 shows a flowchart of a method in accordance with one or more embodiments of the invention. The method depicted in FIG. 2 may be used to obtain PTQ information in accordance with one or more embodiments of the invention. The method shown in FIG. 2 may be performed by, for example, a storage device (e.g., 110, FIG. 1A). Other components of the system in FIG. 1A may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, persistent storage media is formatted using a standard file system format. By formatting the persistent storage media, a storage area may be organized to include a portion of the persistent storage media. The storage resources may be organized in accordance with blocks. The blocks may have addresses (e.g., LBAs) that enable the blocks to be accessed.

In step 202, a PTQ file is created in the formatted persistent storage media. For example, the PTQ file may be created in the storage area of the persistent storage media. Consequently, different portions of the PTQ file may be associated with different LBAs.

In step 204, PTQ information, corresponding to the PTQ file, is stored in the controller. For example, the PTQ information stored in the controller may be similar to that described with respect to FIG. 1D. By storing the PTQ information in the controller, the controller may be able to ascertain when writes to the PTQ file (i) invoke functionality of the storage device or (ii) include a payload for use when performing a functionality. Additionally, the controller may be able to write responses (e.g., response packets) for consumption by an application in a response area of the PTQ file.

The method may end following step 204.

Using the method illustrated in FIG. 2, a controller may be prepared to perform functionality based on writes to predetermined areas of persistent storage media managed by the controller.

Figure 3:
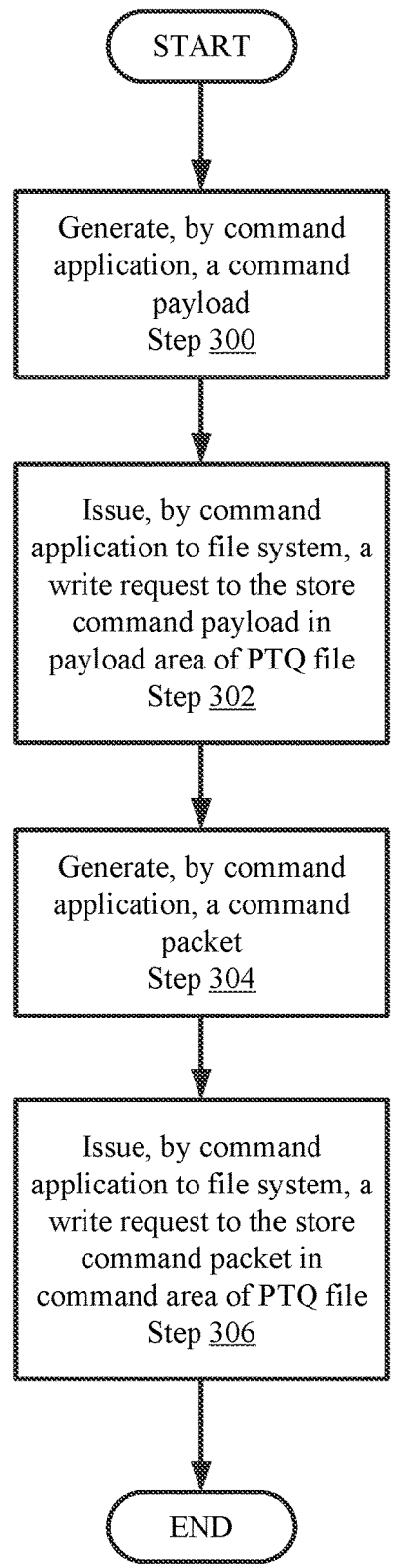
FIG. 3 shows a flowchart of a method of issuing an unsupported command to a device in accordance with one or more embodiments of the invention.

Turning to FIG. 3, FIG. 3 shows a flowchart of a method in accordance with one or more embodiments of the invention. The method depicted in FIG. 3 may be used to transmit a command from an application to a storage device using a write command provided by a driver in accordance with one or more embodiments of the invention. The method shown in FIG. 3 may be performed by, for example, a host (e.g., 100, FIG. 1A). Other components of the system in FIG. 1A may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a command payload is generated by a command application. The command payload may include any type and quantity of data. The command payload may relate to a command that will be issued to a storage device in the future. The command payload may be generated by an application that desires to invoke a functionality of a storage device.

The command payload may be generated, in part or in cooperation with, a command application. The command application may specify data that must be included in a command payload prior to a command being issued to a storage device. The command application may generate the command payload in response to a request from an application. The command payload may be generated in other manners and/or by other components without departing from the invention.

In step 302, a write request to store the command payload in the payload area of the PTQ file is issued to a file system. The write request may be issued by, for example, the command application or another application. The write request may be issued to other management entities (e.g., other than a file system) without departing from the invention.

In step 304, a command packet is generated. The command packet may be generated based on a command to be issued to the storage device. The command packet may include a bit sequence corresponding to the command to be issued to the storage device. The command packet may include additional information without departing from the invention.

The command packet may be generated by the command application. For example, an application may request that the command packet be generated. The command packet may be generated by other entities without departing from the invention.

For example, the command application may provide a command template to an application. The command template may include the bit sequence corresponding to the command to be issued to the storage device and any number of replacement fields. The application may fill in the replacement fields with additional information.

In another example, the command template may be retrieved from a data structure such as a database. Each of the command templates may be keyed to corresponding commands to be issued to the storage device. Once obtained, the application may fill in the replacement fields with additional information.

In step 306, a write request to store the command packet in the command area of the PTQ file is issued. The write request may be issued similarly to that described in step 302. However, the write may be directed to the command area of the PTQ file rather than the payload area of the PTQ file.

The method may end following step 306.

Using the method illustrated in FIG. 3, an application may issue a command to a storage by causing a driver of a host to attempt to write data to a predetermined storage area (e.g., the PTQ file) of the storage device. By doing so, the driver, file system, and/or operating system of the host need not be aware of the functionality of the storage device or implement pass-through modes of operation for an application to invoke all of the functionality of the storage device.

Figure 4:
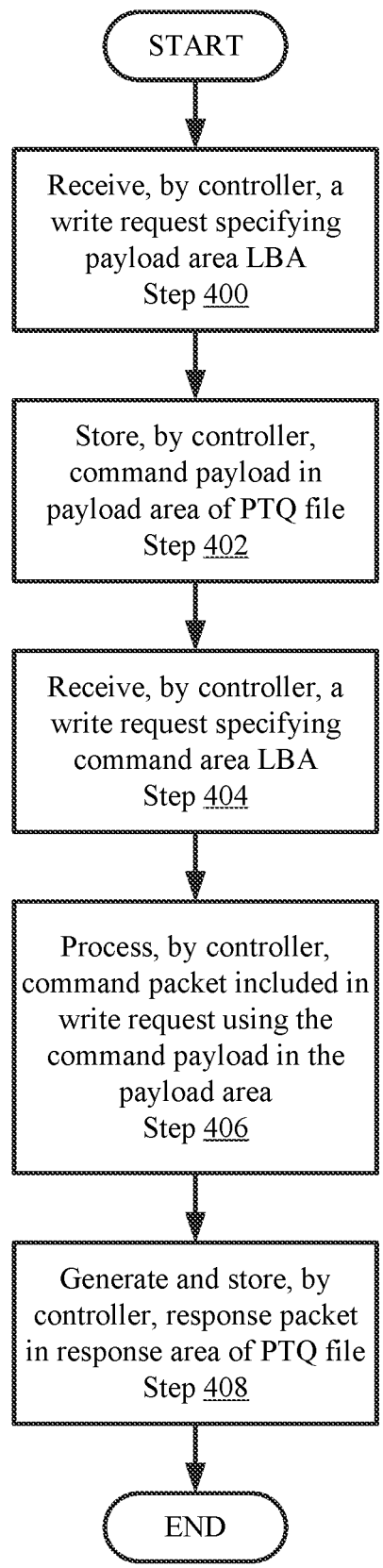
FIG. 4 shows a flowchart of a method of processing an unsupported command in accordance with one or more embodiments of the invention.

Turning to FIG. 4, FIG. 4 shows a flowchart of a method in accordance with one or more embodiments of the invention. The method depicted in FIG. 4 may be used to detect a command from an application and perform the command in accordance with one or more embodiments of the invention. The method shown in FIG. 4 may be performed by, for example, a storage device (e.g., 110, FIG. 1A). Other components of the system in FIG. 1A may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a write request specifying a payload area LBA is received by a controller. As used here, when a write request specifies an address, the write request is specifying that data should be written to the storage resources addressed by the address. In this case, the write request specifies the payload area LBA which is a portion of a PTQ file.

The write request further specifies that a command payload (e.g., a data structure discussed above) is to be written to the storage resources addressed by the payload area LBA.

The write request may have been made by a driver of a host that is only able to invoke a portion of the functionality of the storage device that includes the controller. The controller may determine that the write request specifies the payload area LBA using PTQ information, as described with respect to FIG. 1D.

In step 402, the command payload is stored by the controller in the payload area of a PTQ file. Specifically, the command payload is stored in the storage resources addressed by the payload area LBA. As noted above, the payload area may be a portion of a PTQ file.

In step 404, a write request specifying a command area of the LBA is received by the controller. The write request may be made by the driver of the host. The write request specifying the command area may be received after the write requesting specifying the payload area LBA.

The write request further specifies that a command packet (e.g., a data structure discussed above) is to be written to the storage resources addressed by the command area LBA.

In step 406, the command packet is processed. Processing the command packet may invoke performance of any number and type of functionalities of the storage device. For example, the command packet may include one or more bit sequences that, when read by a controller, invoke corresponding functionalities of the storage device. These functionalities may or may not include use of the command payload stored in step 402.

In step 408, a response packet is generated and/or stored in a response area of the PTQ file. The response packet may be generated via the functionalities invoked in step 406. The response packet may be a data structure that includes any quantity and type of information (e.g., results of functionalities performed in step 406). Different response packets may include similar and/or different types of information.

In some scenarios, a response packet may not include any information. Such a response packet may be generated when the result of the functionalities invoked in step 406 do not result in information that needs to be communicated to an application.

The response packet may be stored in the response area of the PTQ information using PTQ information stored in the controller. As noted above, the LBAs corresponding to the response area of the PTQ file may be stored in the controller. Consequently, the controller may have all of the information required to access, modify, read, etc. the response area of the PTQ file.

The method may end following step 408.

In some embodiments of the invention, a write completion response may be provided to the entity that initiated the write of step 404 following step 408. The write completion response may indicate that the functionalities invoked by the write request of step 404 are completed by the storage device.

Using the method illustrated in FIG. 4, a storage device may perform functionalities desired by an application even when the driver, operating system, and/or file system of the host that hosts the application does not support the invoked functionalities. Consequently, applications need not rely on intermediaries and/or pass-through modes to invoke all of the functionality of devices.

Figure 5:
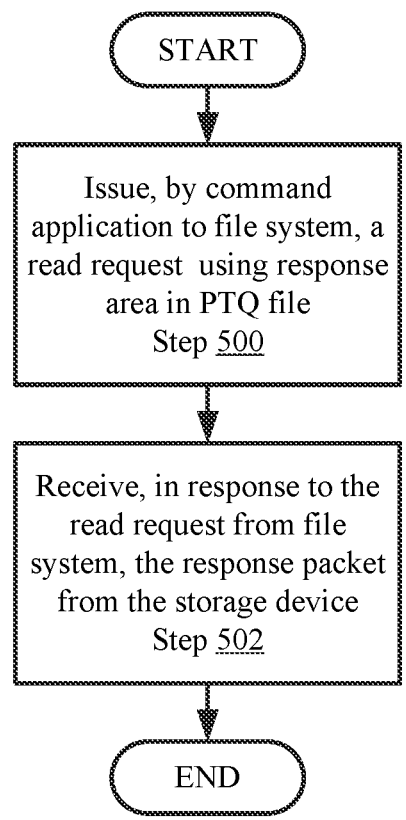
FIG. 5 shows a flowchart of a method of generating a response to an unsupported command in accordance with one or more embodiments of the invention.

Turning to FIG. 5, FIG. 5 shows a flowchart of a method in accordance with one or more embodiments of the invention. The method depicted in FIG. 5 may be used to detect a command from an application and perform the command in accordance with one or more embodiments of the invention. The method shown in FIG. 5 may be performed by, for example, a host (e.g., 110, FIG. 1A). Other components of the system in FIG. 1A may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a read request for a response area in a PTQ file is issued. The read request may be issued by, for example, a command application to a file system. The command application may issue the read request in response to a write completion response (e.g., a write completion for the write in step 404).

In step 502, a response packet is received from the storage device. The response packet may have been stored in the response area of the PTQ file. Consequently, issuing the read through the file system and driver may enable the storage device to provide information regarding functionalities of the storage device that were invoked but not supported by a driver of the host.

The response packet may include any quantity and type of information. The response packet may include information that enables the application, command application, and/or other entities in the control plane of the host to understand the functionalities and/or results of the functionalities of the storage device that were invoked.

The method may end following step 502.

Using the method illustrated in FIG. 5, functionalities of a storage device that were not supported by a driver of a host may be provided to an application that invoked the storage device functionalities. Consequently, a closed information loop between the application and storage device may be formed even when intermediaries (e.g., files systems, operating systems, drivers) do not support the loop and/or functionalities of the storage device.

Figure 6:
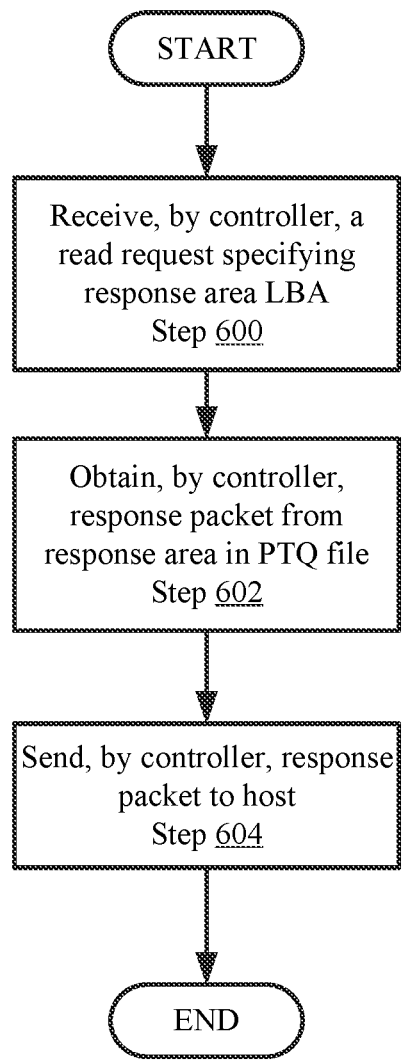
FIG. 6 shows a flowchart of a method of providing a response to an unsupported command in accordance with one or more embodiments of the invention.

Turning to FIG. 6, FIG. 6 shows a flowchart of a method in accordance with one or more embodiments of the invention. The method depicted in FIG. 6 may be used to provide information to applications regarding functionalities invoked by the application in accordance with one or more embodiments of the invention. The method shown in FIG. 6 may be performed by, for example, a storage device (e.g., 110, FIG. 1A). Other components of the system in FIG. 1A may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

In step 600, a read request specifying a response area LBA is received. The read request may be received by a controller of a storage device. The response area LBA may address a response area of a PTQ file.

In step 602, a response packet from the response area of the PTQ file is obtained. The response packet may be all, or a portion, of the data included in the response area of the PTQ file. The response packet may include any type and quantity of information. The response packet may include information regarding one or more functionalities of the storage device that were invoked using a write rather than being invoked directly by a driver or other entity of the host.

In step 604, the response packet is sent to the host. The response packet may be sent to the host by the controller as a response to the read request of step 600.

The method may end following step 604.

Using the method illustrated in FIG. 6, a storage device may provide information regarding functionalities that it has performed. The functionalities may not have been supported by drivers or other management entities of the host.

To further clarify embodiments of the invention, a non-limiting example is provided in FIG. 4. FIG. 4 shows a system similar to that illustrated in FIG. 1. For the sake of brevity, only a limited number of components of the system of FIG. 1 are illustrated in FIG. 4.

EXAMPLE

The following section describes an example to illustrate various embodiment of the invention. The example is not intended to limit the scope of the invention.

Figure 7:
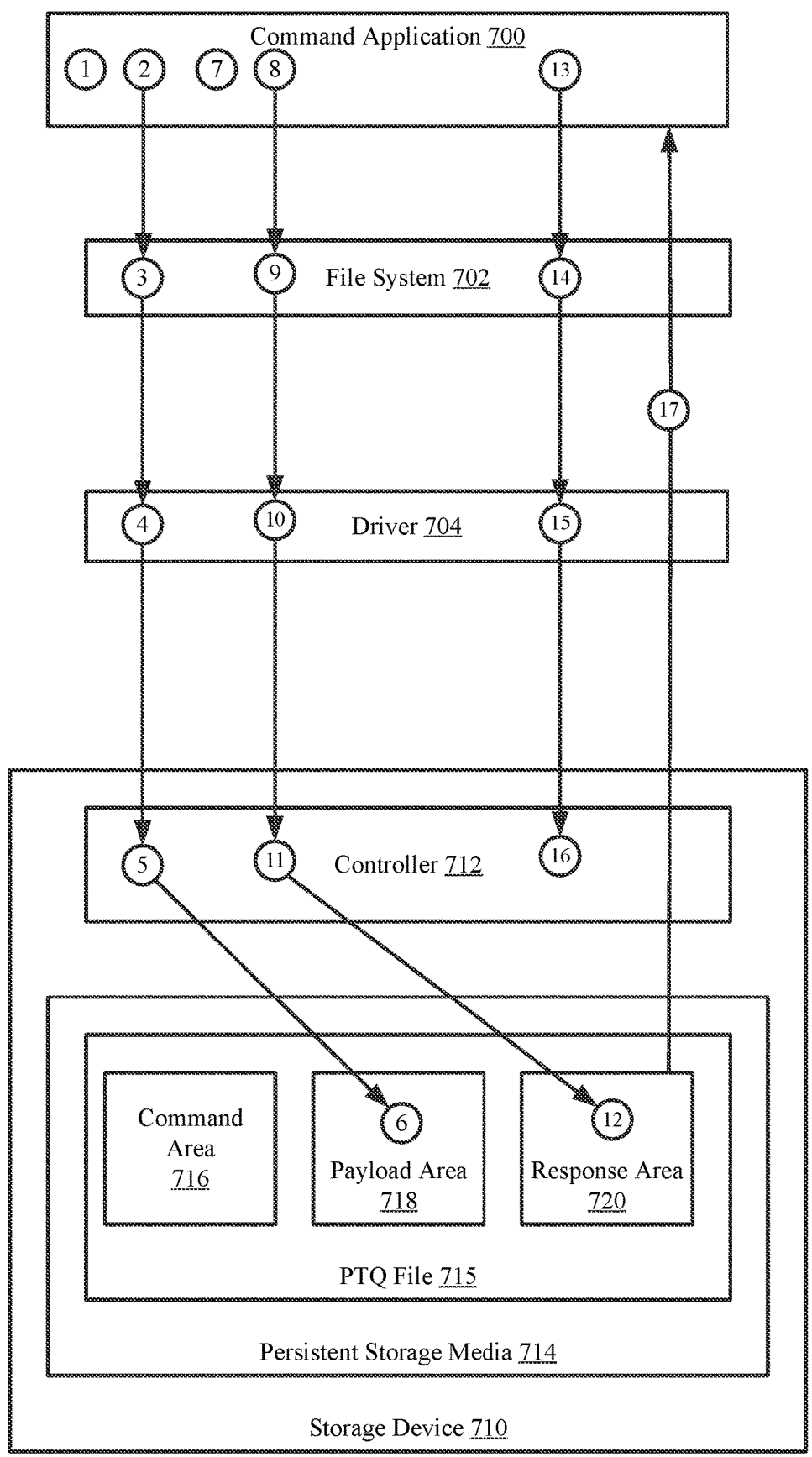
FIG. 7 shows a diagram of an example system and its operation over time in accordance with one or more embodiments of the invention.

Turning to the example, consider a scenario as illustrated in FIG. 7 in which an application (not shown) desires to retrieve a set of statistics maintained by a storage device (710). Specifically, the application wants the storage device (710) to report statistical counters maintained for the persistent storage media (714). However, this functionality of the storage device (710) is not supported by a file system (702) or driver (704) of a host that hosts the application. Further, the driver (704) does not support a pass-through mode or another mode of operation that would allow the application to directly issue such a request to invoke the desired functionality of the storage device. To invoke the desired functionality of the storage device (710), the application initiates performance of a method as follows.

In step 1, the application issues a request for a command application (700) to generate a command payload that specifies a list of statistics to retrieve. In response, the command application (700) generates the command payload. After generating the command payload, in step 2, the command application (700) generates and issues a write to the file system (702). The write is directed toward a payload area (718) of a PTQ file (715) hosted by persistent storage media (714) of the storage device (710). Specifically, the write specifies that the write is for the PTQ file (715) and includes an offset to the payload area (718).

When the write request is received by the file system, the file system, in step 3, identifies the LBA associated with the PTQ file (715) and the offset (e.g., the payload area (718)). In step 4, the file system (702) issues a write to the driver (704) and specifies that the payload is to be written to the identified LBA.

In response, the driver (704), in step 5, issues a write command to the storage device (710). The controller (712) analyzes the write command and determines that it is directed toward the payload area (718). Consequently, the controller (712), in step 6, writes the command payload to the payload area (718).

In step 7, the command application (700) generates a command packet that specifies that the statistical analysis functionality of the storage device (710) is to be performed using the command payload stored in the payload area (718). To do so, the command application (700) adds a bit sequence corresponding to the statistical analysis functionality. After generating the command packet, the command application (700), in step 8, generates a write request for the command packet directed toward the command area (716). Specifically, the write request specifies the PTQ file (715) and an offset to the command area (716).

In step 9, the command application (700) issues the write request to the file system (702). In response to the write request, the file system (702) identifies the LBAs corresponding to the command area (716). In step 10, the file system (702) issues a write request for the command packet to the LBAs to the driver (704). The driver (704), in turn in step 11, issues a corresponding write request to the controller (712).

When the controller (712) receives the write request, it determines that the write request is directed toward the command area (716) of the PTQ file (715). Consequently, the controller (712) determines that the data to be written to the command area (716) is, in fact, a command packet. Based on this determination, the controller (712) analyzes the bit sequence of the command packet and determines that file type processing using the command payload in the payload area (718) is to be performed.

The controller (712) performs the statistics processing and generates a response packet. The response packet indicates the result of the processing (i.e., how many of each file type is stored in the persistent storage media (714) based on classification scheme included in the command payload. Once generated, in step 12, the controller (712) stores the response packet in the response area (720).

In step 13, the command application (700) generates a read request for the response area. Specifically, the read request specifies the PTQ file (715) and an offset to the response area (720). In step 14, the command application (700) issues the read request to the file system (702). The file system (702) identifies the LBAs corresponding to the response area (720) and generates a read request based on the LBAs.

In step 15, the file system (702) issues the read request to the driver (704). The driver (704), in step 16, issues the read request to the controller (712). In step 17, the controller (712) reads the response area (720) based on the read request and provides the data in the response area (720) to the command application (700). Because the response area (720) includes a response packet (e.g., step 12), the response packet is provided to the command application (700) via the processing of the read request.

End of Example

Using the method illustrated in FIG. 7, an application may invoke any functionality of a storage device or other type of device even when drivers or file systems used to operate the storage device do not support the invoked functionality. To do so, the application may issue using other functionality of the drivers, operating systems, or other management entities to cause the functionality not supported by the management entities to be invoked.

Figure 8:
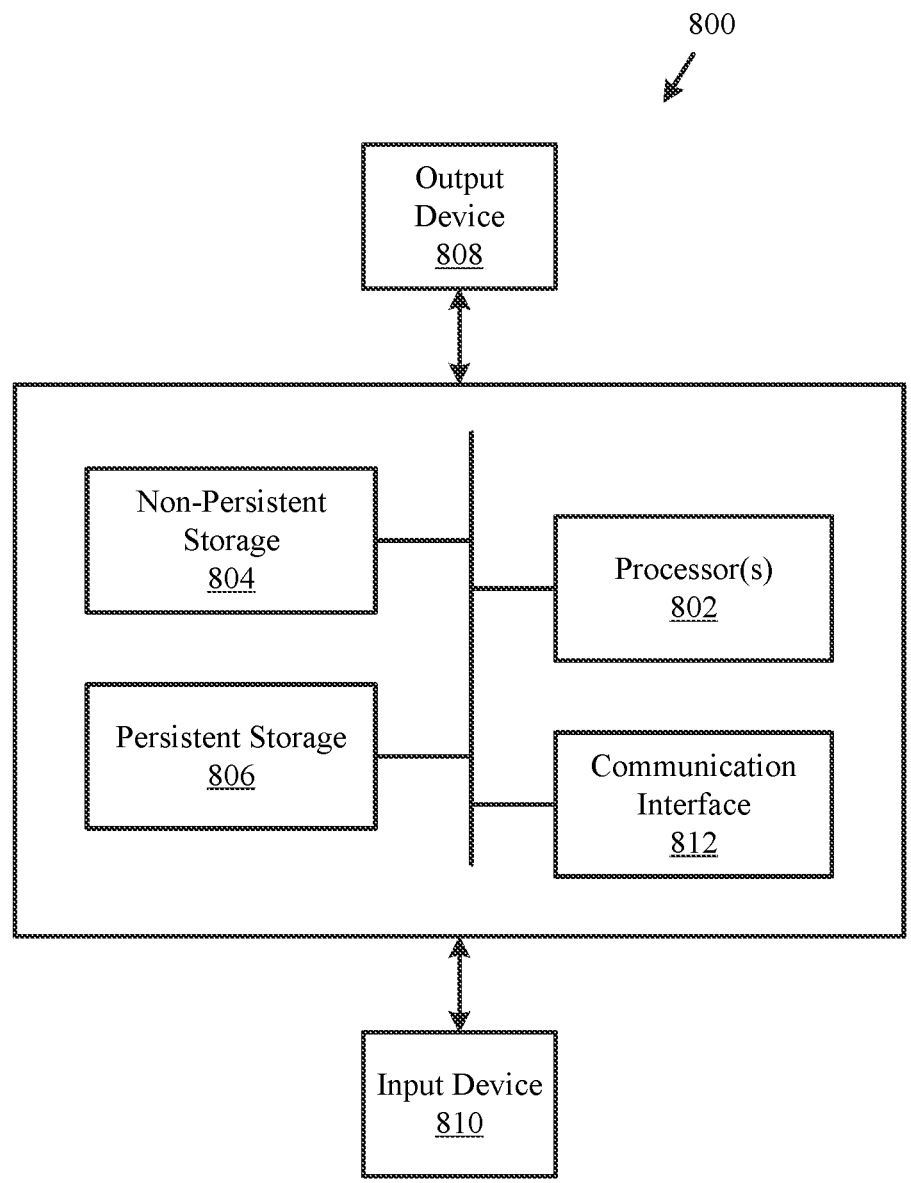
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may provide a system and method for invoking the functionality of a device that is not supported by another device. To do so, embodiments of the invention may provide a system that utilizes functionality that is supported by another device to invoke unsupported functionality of a device. For example, write commands supported by drivers may be utilized to invoke other types of functions that are not supported. Consequently, unsupported functionality of a device may be invoked by another device without requiring that drivers or other management entities of the another device be updated to support the invoked functionality.

Thus, embodiments of the invention may address the problem functionality compatibility. Specifically, embodiments of the invention may enable unsupported functionality to be utilized without requiring that it be natively supported by the host operating system or its device drivers.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A storage device for providing data storage services to a host, comprising:
   persistent storage comprising a file, wherein the file comprises a command portion, a payload portion, and a response portion; and
   a controller programmed to:
      obtain a write request from the host for the file, wherein the write request comprises a command packet and specifies a logical block address (LBA);
      make a first determination that the LBA is associated with the command portion, in response to first determination:
         perform processing of the command packet using a payload portion of the file, wherein processing of the command packet comprises reading a bit sequence in the command packet and invoking a functionality of the storage device based on the reading of the bit sequence;
         generate a response packet based on the processing of the command packet, wherein the response packet comprises a response that is generated by the functionality of the storage device and a payload in the payload portion; and
         store the response packet in a response portion of the file.

2. The storage device of claim 1, wherein the controller is further programmed to:
   prior to obtaining the write request:
      obtain a second write request from the host for the file, wherein the second write request comprises the payload and specifies a second LBA;
      make a second determination that the second LBA is associated with the payload portion,
      store, in response to second determination, the payload in the payload portion of the file.

3. The storage device of claim 2, wherein the controller is further programmed to:
   after storing the response packet in the file:
      obtain a read request from the host for the file, wherein the read request specifies a third LBA;
      making a third determination, that the third LBA is associated with a response portion; and
      provide, in response to the third determination, a copy of the response to the host.

4. The storage device of claim 1, wherein the response portion, the payload portion, and the command portion are different portions of the file.

5. The storage device of claim 1, wherein processing the command packet comprises performing one or more actions that cannot be initiated by an operating system or device driver of the host.

6. The storage device of claim 1, wherein processing the command packet comprises performing one or more actions that cannot be initiated by a driver of the host that facilitates use of the storage device by the host.

7. A method for providing data storage services to a host using a storage device, comprising:
- obtaining, by the storage device, a write request for a file stored in the storage device, wherein the write request comprises a command packet and a logical block address (LBA);
- making a first determination, using pass-through queue (PTQ) information stored in the storage device and the LBA, that the write request is directed to a command portion of the file;
- in response to the first determination,
  - processing, by the storage device, the command packet using a payload portion of the file;
  - generating, by the storage device, a response packet based on the processing of the command packet; and
  - storing, by the storage device, the response packet in a response portion of the file.

8. The method of claim 7, further comprising:
prior to obtaining the write request:
- obtaining a second write request for the file, wherein the second write request comprises a payload for the command packet and a second LBA;
- making a second determination, using the PTQ information and the second LBA, that the write request is directed to the payload portion of the file; and
- storing, based on the second determination, the payload in the payload portion of the file.

9. The method of claim 7, further comprising:
after storing the response packet in the file:
- obtaining a read request for the file, wherein the read request specifies a second LBA;
- making a second determination, using the PTQ information and the second LBA, that the read request is directed to the response portion of the file; and
- providing, in response to the second determination, a copy of the response portion to an entity that issued the read request.

10. The method of claim 7, wherein the response portion, the payload portion, and the command portion are different portions of the file.

11. The method of claim 7, wherein the storage device stores a command application, wherein the command application is programmed to generate the write request.

12. A non-transitory computer readable medium comprising computer readable program code, which when executed by a computer processor enables the computer processor to perform a method for providing data storage services to a host using a storage device, the method comprising:
- obtaining, by the storage device, a write request from the host for a file stored in the storage device, wherein the write request comprises a command packet and a logical block address (LBA);
- making a first determination, using pass-through queue (PTQ) information stored in the storage device and the LBA, that the write request is directed to a command portion of the file;
- in response to the first determination,
  - processing, by the storage device, the command packet using a payload portion of the file, wherein, as part of the processing, the command packet is not stored in the command portion of the file;
  - generating, by the storage device, a response based on the processing of the command packet; and
  - storing, by the storage device, the response in a response portion of the file.

13. The non-transitory computer readable medium of claim 12, wherein the method further comprises:
prior to obtaining the write request:
- obtaining a second write request from the host for the file, wherein the second write request comprises a payload for the command packet and a second LBA;
- making a second determination, using the PTQ information and the second LBA, that the write request is directed to the payload portion of the file; and
- storing, in response to the second determination, the payload in the payload portion of the file.

14. The non-transitory computer readable medium of claim 12, wherein the method further comprises:
after storing the response in the file:
- obtaining a read request from the host for the file, wherein the read request specifies and a second LBA;
- making a second determination, using the PTQ information and the second LBA, that the read request is directed to the response portion of the file; and
- providing, in response to the second determination, a copy of the response to the host.

15. The non-transitory computer readable medium of claim 14, wherein the response portion, the payload portion, and the command portion are different portions of the file.

* * * * *